Fig. 1.

Inventor:
Ronald Aspden,
By John E. Toupal
Attorney

Fig. 4.

March 2, 1971 R. ASPDEN 3,566,544
OPTICAL SURFACE GENERATING METHOD AND APPARATUS
Filed April 25, 1968 5 Sheets-Sheet 4

Inventor:
Ronald Aspden,
by John E. Toupal
Attorney

March 2, 1971  R. ASPDEN  3,566,544
OPTICAL SURFACE GENERATING METHOD AND APPARATUS
Filed April 25, 1968  5 Sheets-Sheet 5

Fig. 2.

Inventor:
Ronald Aspden,
by John E. Toupal
Attorney

United States Patent Office 3,566,544
Patented Mar. 2, 1971

3,566,544
OPTICAL SURFACE GENERATING
METHOD AND APPARATUS
Ronald Aspden, Bedford, Mass., assignor to
Itek Corporation, Lexington, Mass.
Filed Apr. 25, 1968, Ser. No. 724,082
Int. Cl. B24b 7/24, 1/00
U.S. Cl. 51—55                                    33 Claims

ABSTRACT OF THE DISCLOSURE

A surface generating system wherein an optical lap is moved over the surface of an optical blank in a path having both circumferential and oscillating radial components. Continuous and selective variations in the amplitude of the radial component produces a desired radially symmetrical contour on the work surface.

BACKGROUND OF THE INVENTION

This invention relates generally to a method and apparatus for generating optical surfaces. More particularly, the invention relates to a method and apparatus especially suited for generating radially symmetric optical surfaces.

Radially symmetric optical surfaces are most commonly generated with machines that produce relative movement between an optical lap and the work surface of a suitable optical blank. The relative movement normally comprises both circumferential and radial components such that the lap periodically passes over all areas on the work surface. In a typical machine, the circumferential component is produced by rotating the optical bank and the radial component is produced by reciprocation of the lap. The particular repetitive path followed by the lap on the work surface is established by manual adjustment of the machine and during a typical polishing operation, a technician will periodically readjust the machine so as to alter the path of relative movement. These periodic modifications in the paths of relative movement are made in attempts to produce a desired surface contour and are made according to completely empirically developed techniques.

The generation of radially symmetric surfaces with machines of this type suffers from a number of disadvantages including the requirement for highly skilled technicians, lengthy processing periods, and insufficient degrees of reliability and precision. These deficiencies are accentuated in the production of relatively large surfaces of, for example, fifteen-inch diameter and larger which tend to develop rotational asymmetries to a greater degree than do small diameter surfaces. Thus, a general need exists for improved optical surface generation systems.

The object of this invention, therefore, is to provide an improved optical surface generating system capable of producing radially symmetric optical surfaces in an efficient and highly controlled manner.

CHARACTERIZATION OF THE INVENTION

The invention is characterized by the provision of a surface generating system including a blank support adapted to support an optical blank, a surface modifying mechanism adapted to alter relative elevations on the work surface of the supported optical blank, a drive mechanism for producing, between the lap and work surface, relative transverse movement having both circumferential and oscillating radial components, and an automatic controller for continuously and selectively varying the amplitude of the oscillating radial component of relative movement. Automatic, programed control of the oscillating radial component of relative movement permits the efficient generation of highly precise radially symmetric optical surfaces.

One feature of the invention is the provision of an optical surface generating system of the above type wherein the surface modifying mechanism is a conventional optical lap suitable for grinding and polishing of optical surfaces. With this system, a desired radially symmetric surface is generated by selective removal of material from the work surface of the optical blank.

Another feature of this invention is the provision of an optical surface generating system of the above featured type wherein the controller produces a varying number of movements of the optical lap over each of a plurality of circularly, annular radially spaced areas on the work surface and the different numbers of such movements have a particular relationship predetermined so as to generate the desired surface. By accurately controlling the number of lap movements over each of the radially spaced annular areas, predetermined specific volumes of blank material can be removed from those areas so as to produce the desired radially symmetric surface.

Another feature of this invention is the provision of an optical surface generating system of the above featured type wherein the controller randomly varies the amplitude of the oscillating radial component of relative movement. Random variation of the radial component amplitude prevents the optical lap from retracting its movements over the work surface thereby insuring the generation of a surface having high optical quality.

Another feature of this invention is the provision of an optical surface generating system of the first featured type wherein the controller successively reverses the directional sense of the radial component of relative movement when the optical lap is perpendicularly adjacent to predetermined, continuously different radial positions on the work surface. Reversing the direction of the radial component at predetermined relative positions between the lap and the work surface permits the generation of a desired surface contour while continuously changing the positions of reversal enhances the optical quality of the surface produced.

Another feature of this invention is the provision of an optical surface generating system of the above featured type wherein the controller includes a guide retaining information relating to the relative positions of radial component direction reversal and a sensor which effects the direction reversals in response to actuation by the guide. In this arrangement, a guide which has been programed with information regarding the surface contour desired is utilized to initiate the desired direction reversals in the radial component of relative movement.

Another feature of this invention is the provision of an optical surface generating system of the above featured type wherein the drive mechanism produces the circumferential component of relative movement by rotating the optical blank and produces the radial component of relative movement by reciprocating the optical lap transversely over the work surface. By separately driving the lap and the blank, the two desired components of relative movement therebetween are produced in a simple and easily controlled system.

Another feature of this invention is the provision of an optical surface generating system of the above featured type wherein the guide includes a first set of information that effects radial component direction reversals of one sense and a second set of information that effects radial components direction reversals of the opposite sense. In this very simple arrangement, the lap is radially reciprocated with a varying amplitude determined by two sets of information that produce opposite directions of lap movement reversals.

Another feature of this invention is the provision of an optical surface generating system of the above featured type wherein the sensor element is reciprocated between the first and second guides in synchronism with the optical lap and produces the direction reversals in response to periodic operative engagements with the guides. In a preferred embodiment, the first and second guides comprise disc cams driven at different rotary speeds so as to produce random changes in the amplitude of the lap's radial movement over the work surface.

Another feature of the invention is the provision of an optical surface generating system of the above featured types wherein the operating surface area of the optical lap is smaller than the area of the work surface. The use of a surface modifying mechanism with an operating area less than that of the work surface enhances the selective surface generation flexibility of the system.

The invention is further characterized by the provision of a surface generating method including the steps of producing relative transverse movement between a surface modifying mechanism and the work surface of a optical blank, producing the relative transverse movement in a path having both circumferential and oscillating radial components, and continuously and selectively varying the amplitude of the oscillating radial component of relative transverse movement. Continuous selective variations of the oscillating radial component of relative movement permits the efficient generation of highly precise and predictable radially symmetric optical surfaces.

Another feature of the invention is the provision of a surface generating method of the above characterized type wherein the continuous selective variations in the amplitude of the radial component of relative movement is produced by reversing the direction of the radial component at predetermined continuously changing radial positions on the work surface. Position control of the radial component direction reversals provides an extremely precise method of surface generation.

These and other characteristics and features of the present invention will become more apparent upon a perusal of the following specificaton taken in conjunction with the accompanying drawings wherein:

FIG. 7 is a diagrammatic illustration of guide cams corresponding to the information plotted in FIG. 6.

Figure 1:
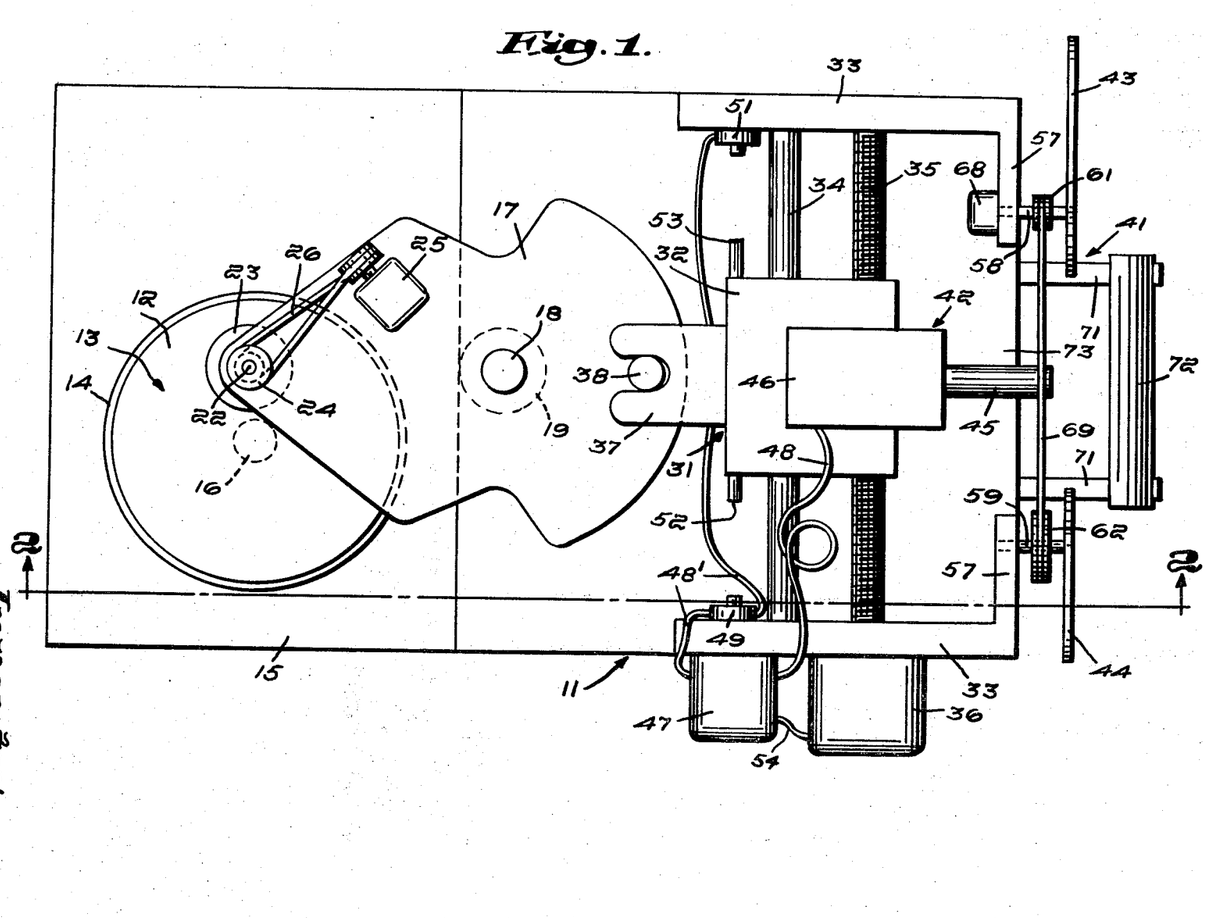
FIG. 1 is a schematic plan view of a preferred embodiment of the invention.
Figure 2:
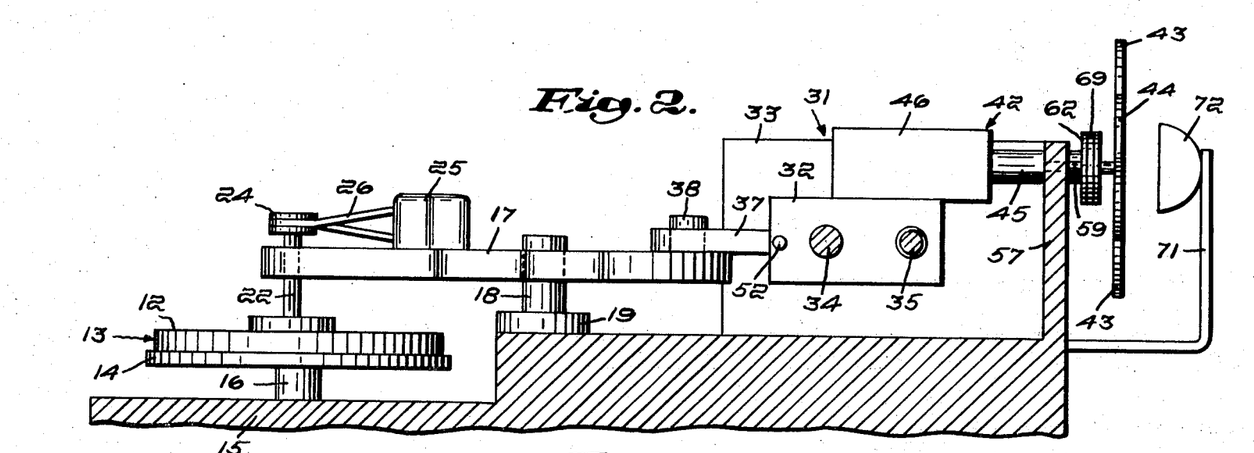
FIG. 2 is a cross-sectional view taken along lines 2—2 of FIG. 1.
Figure 3:
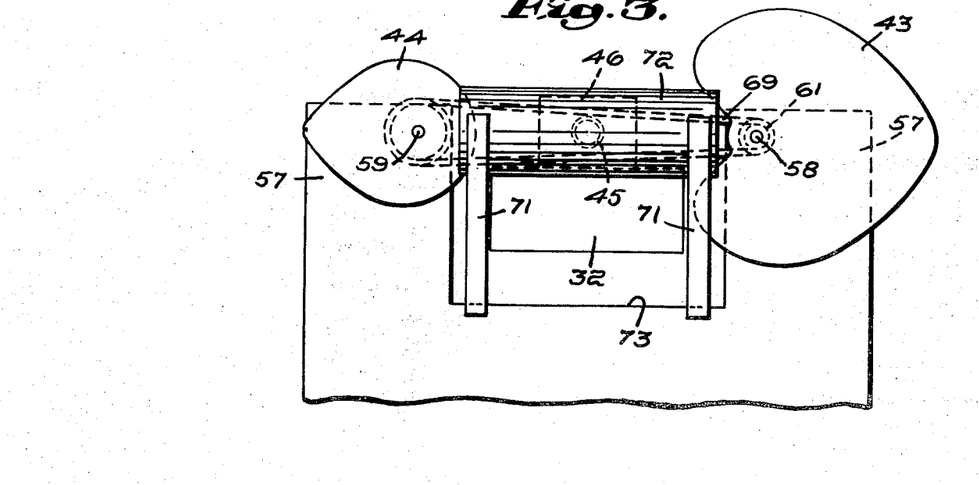
FIG. 3 is an end view of the invention embodiment shown in FIG. 1.

Referring now to FIGS. 1–3, there is shown the optical surface generating system 11 adapted for grinding or polishing the work surface 12 of the optical blank 13. Supporting the blank 13 is the turntable 14 rotatably supported from the system base 15 by the shaft 16 which is driven by a suitable drive motor (not shown). The pivot plate 17 is mounted for pivotal movement on the support column 18 which extends out of the mounting block 19 on the system base 15. Rotatably supported by one end of the pivot plate 17 is the shaft 22 having one end keyed for rotation with the surface modifying optical lap 23 and the other end keyed to the pulley 24. Rotation of the lap 23 is provided by the drive motor 25 which is operatively coupled to the pulley 24 by the drive belt 26.

Also supported on the system base 15 is the drive assembly 31 including the traverse plate 32 mounted between the assembly's side walls 33. The traverse plate 32 is mounted on the ball slide 34 and is driven by operative engagement with the threaded shaft 35. The opposite ends of the ball slide 34 are fixed in the sidewalls 33 while the drive shaft 35 is mounted for rotation therein and is operatively coupled to the drive motor 36. Fixed to one edge of the traverse plate 32 is the yoke 37 that loosely engages the pin 38 extending from the pivot plate 17 at one end opposite the lap member 23.

The surface generating system 11 also includes the control unit 41 primarly formed by the sensor unit 42 and the disc cams 43 and 44. The sensor unit 42 comprises the hollow open end sensor tube 45 that transmits light to a photocell disposed within the control circuit housing 46 mounted on the traverse plate 32. Connecting the control circuit in housing 46 with a power supply circuit in the housing 47 is the electrical cable 48. Also connected to the power supply in housing 47 by the electrical cables 48' are the contact switches 49 and 51 mounted on the inner surfaces of the side walls 33. The contact switches 49 and 51 are aligned, respectively, with the pins 52 and 53 that project from opposite edges of the traverse plate 52. Also connected to the power supply in housing 47 by the electrical cable 54 is the drive motor 36.

Rotatably supported from the end wall 57 on shafts 58 and 59, respectively, are the disc cams 43 and 44. The shaft 58 is keyed to the drive pulley 61 having a diameter one half that of the drive pulley 62 fixed to the shaft 59. Rotation of the cam disc 43 is produced by mechanical coupling with the drive motor 68 while disc cam 44 is rotated by the drive belt 69 that extends between the pulleys 61 and 62. Supported from the end wall 57 by brackets 71 is the light source 72 that is horizontally aligned with the open end of sensor tube 45 through the end wall recess 73, as shown in FIG. 3.

Figure 4:
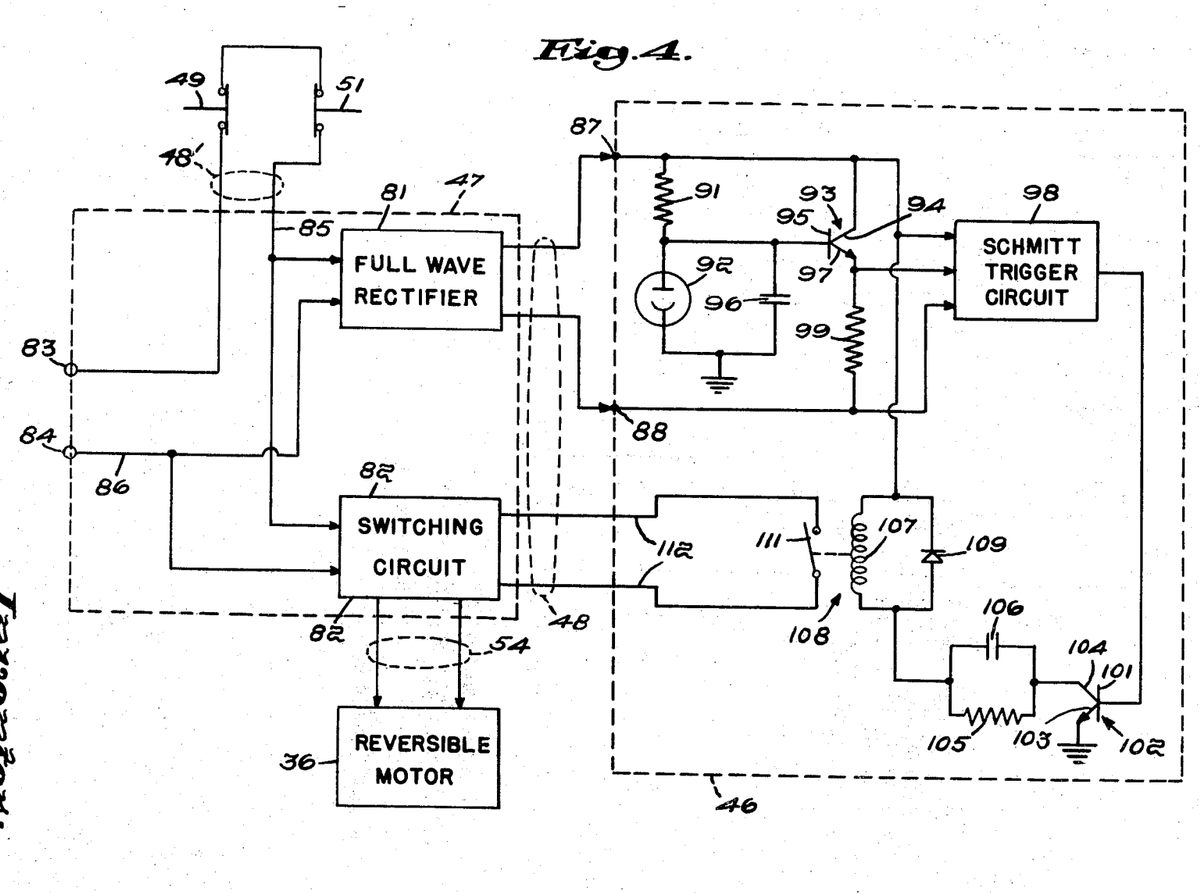
FIG. 4 is a schematic diagram of a control circuit for the system shown in FIGS. 1–3.

Referring now to FIG. 4 there is shown schematically the circuitry included in the sensor housing 46 and the power supply housing 47. Enclosed in the power supply housing 47 is the full wave rectifier 81 and a switching circuit 82 both connected to the AC supply terminals 83 and 84 by the leads 85 and 86. Series connected in the electrical line 85 are the contact switches 49 and 51 also shown in FIG. 1. The positive and negative outputs of rectifier 81 are applied, respectively, to the terminals 87 and 88 of the sensing circuit in housing 46.

Connected in series between the positive terminal 87 and ground are the resistor 91 and the photocell 92 that is positioned so as to receive light transmitted through the hollow sensor tube 45 shown in FIGS. 1–3. The transistor 93 has a collector electrode 94 connected to the positive terminal 87 and a base electrode 95 connected to the junction between the photocell 92 and the resistor 91. Coupled between the base electrode 95 and ground is the capacitor 96. The emitter electrode 97 is connected directly to the Schmitt trigger circuit 98 and to the negative terminal 88 by the resistor 99. Also applied to the Schmitt trigger circuit 98 are the positive and negative voltages on terminals 87 and 88, respectively.

The output of the Schmitt trigger circuit 98 is applied to the base electrode 101 of the transistor 102 which has a grounded emitter electrode 103. Connected to the collector electrode 104 is the parallel combination of the resistor 105 and the capacitor 106. The winding 107 of relay 108 is connected between the positive terminal 87 and the parallel combination of the resistor 105 and the capacitor 106. Shunting the winding 107 is the diode 109. The contacts 111 of the relay 108 are connected by leads 112 to the switching circuit 82 located in the power supply housing 47.

During operation of the surface generating system 11, the motor (not shown) operatively coupled to the turntable 14 and the drive motors 25 and 68 are energized to produce rotation, respectively, of the optical blank 13, the optical lap 23 and the disc cams 43 and 44. Simultaneously, a source of A.C. power is applied to the input terminals 83 and 84 (FIG. 4) producing energization of the reversible drive motor 36 through the switching circuit 82. This prompts rotation of drive shaft 35 and resultant translation of the transverse plate 42 in a direction determined by the rotational direction of the motor 36.

Assuming movement of the transverse plate 32 in an upward direction, as shown in FIG. 1, the pivot plate 17 is rotated counterclockwise producing radial movement of the lap 23 toward the center of the work surface 12. This movement continues until the open end of the sensor tube 45 is shielded from the light source 72 by the outer marginal portion of the cam disc 43. With this relative positioning between the sensor tube 45 and the disc cam 43, activating light is prevented from reaching the photocell 92 (FIG. 4) which, consequently, exhibits a higher impedance. Responsive to the impedance change, firing potential is applied to the base electrode 95 of the transistor 93 which in turn activates the Schmitt trigger circuit 98. The output of the Schmitt trigger circuit 98 fires the transistor 102 allowing a pulse of energizing current flow through the relay winding 107. This momentarily closes switch contacts 111 to activate a conventional latching type relay (not shown) in the switching circuit 82. Responsive to actuation of the latching relay, the switching circuit 82 reverses the polarities applied to the motor 36 thereby reversing the direction of its rotation.

After reversal of the motor 36, the traverse plate 32 is driven in a downward direction, as viewed in FIG. 1. This causes clockwise rotation of the pivot plate 17 and associated radial movement of the lap 23 away from the center of the work surface 12. Such movement continues until the open end of the sensor tube 45 is shielded from the light source 72 by the outer marginal portion of the disc cam 44. In this position the photocell 92 is again shielded from acivating light and the sensing circuit 46 responds, as described above, to produce an energizing pulse to the relay winding 107. Momentary closing of the switch contacts 11 actuates the switching circuit 82 to again reverse the polarities applied to the drive motor 36. Thus, the traverse plate 32 resumes movement in an upward dirrection, and the lap 23 resumes radial movement in a direction toward the center of the work surface 12.

It will be obvious from the above description that the traverse plate 32 and the integrally mounted sensor unit 42 continuously reciprocate between optical engagements with the outer peripheries of the disc cams 43 and 44 and that the optical lap 23 is synchronously oscillated in a substantially radial path along the work surface 12. Because of this lap oscillation and the simultaneous rotation of the optical blank 13, there is produced a path of relative movement between the optical lap 23 and the work surface 12 having both circumferential and radial components. During this relative movement, the lap 23 fuctions in the conventional manner to remove material from the discrete work surface 12 area with which it is in contact. However, since the amplitude of the radial lap oscillations can be continuously varied in a predetermined manner by the control system 41, highly selective, radially symmetric polishing of the work surface 12 can be achieved. An example of how the control system 41 can be used to generate a desired surface contour on the work surface 12 is described below.

Figure 5:
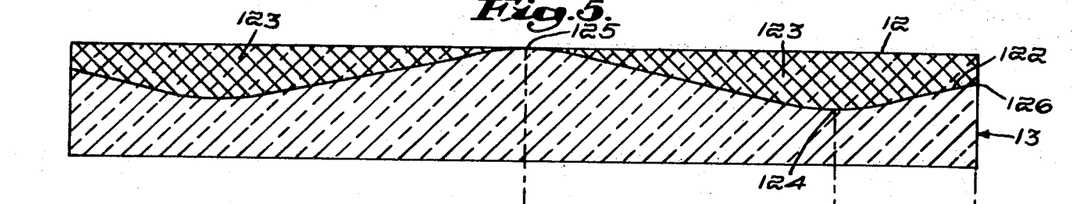
FIG. 5 is a cross-sectional view of an optical blank illustraing a desired surface change.

Assume that one desires to produce a Schmidt plate from the circular blank 13 illustrated in diametrical cross-section in FIG. 5. The well known radially symmetric surface contour required for a Schmidt plate is diagrammatically represented by the contour line 122. Obviously, generation of the surface 122 requires removal from the blank 13 of a material volume represented in section by the shaded area 123. Since the volume of blank material to be removed is radially symmetric, one can analyze the material removal requirements by considering a radial section through that volume as illustrated, for example, by the right half of the area 123 in FIG. 5.

Referring to that area, it will be noted that a maximum depth of blank material must be removed along a concentric circle represented by the point 124 and that lesser material depths must be removed at the center 125 of the blank 121 and along its outer periphery 126. Thus, the lap 23 must polish an annular surface area centered on the circle represented by point 124 to a greater extent than areas located at the blank's center 125 or at its outer periphery 126. Furthermore, since the sense of the contour line 122 slope does not change between point 124 and the blank's center 125, annular concentric work surface 12 areas between these boundaries each require a different depth of blank material removal with depths increasing in the radial direction between the blank's center 125 and the circle represented by point 124. Similarly, decreasing depths of blank material must be removed from the radially spaced, annular surface areas between the circle represented by point 124 and the outer periphery 126.

According to the present invention, the various blank material removal depths required for generation of the surface contour 122 are developed by controlling precisely the relative time spent by the lap 23 in radially spaced, circular concentric areas on the work surface 12. The desired relationship is created by continuously varying in a predetermined manner the amplitude of the lap's 23 radial oscillations produced by the pivot plate 17. This varying amplitude is established so as to accurately control the relative number of times that the center of the lap 23 traverses various radial positions on the work surface 12.

Figure 6:
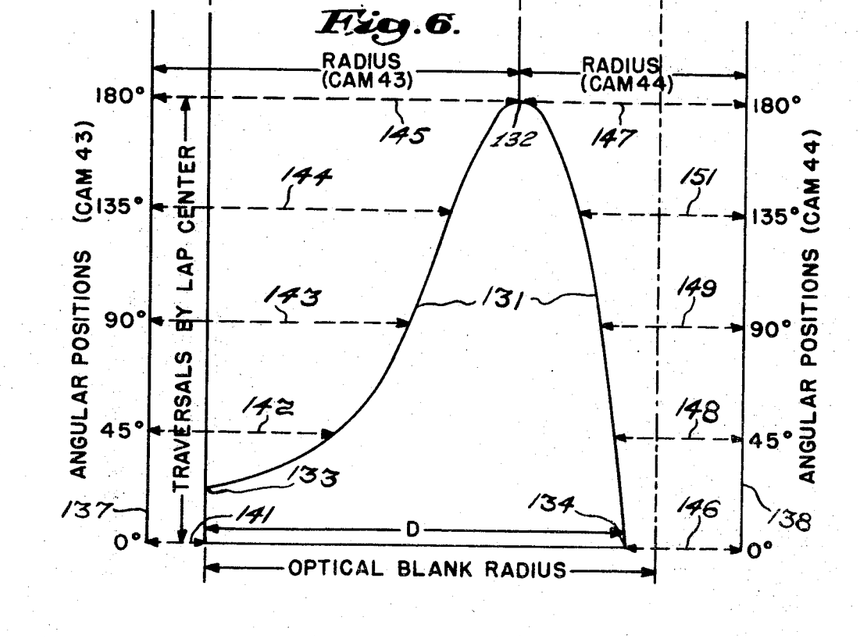
FIG. 6 is a diagram in which there is plotted optical blank radius versus lap center traversals required to generate the surface contour shown in FIG. 5.

The relationship between lap center traversals and optical blank radius is shown by curve 131 in FIG. 6. Lap center traversals are plotted along the ordinate axis and optical blank radius is plotted along the abscissa axis. The plotted curve 131 is aligned vertically with the cross-section of optical blank 13 shown in FIG. 5 so as to facilitate a comparison of the factors represented in these figures. However, it should be noted that the indicated vertical alignments of particular points in FIGS. 5 and 6 are merely illustrative and not limiting. For example, although point 124 in FIG. 5 indicating the blank radius requiring the greatest depth of material removal is shown vertically aligned with the curve's 131 vertex 132, this relationship need not and in most cases would not exist. As would be expected, the curve 131 slopes downward on both sides of the vertex 132 terminating at the low points 133 and 134. The low point 133 represents the center 125 of the optical blank which as noted above required a minimum depth of blank material removal inside the radius 124 and low point 134 represents a blank radius closely adjacent its outer periphery 126. It should be noted again here that the ordinate in FIG. 6 plots traversals by the lap center and not the lap edge. Thus, the termination of curve 131 at point 134 at a blank radius less than maximum does not imply that an outer marginal portion of the blank remains untouched by the surface of the lap 23. For example, the lap 23 may have a diameter equal to one half the radius of the work surface 12.

A mathematical analysis of the curve 131 with respect to the required blank material removal depths illustrated in FIG. 5 is extremely complex because of the numerous variables involved. Examples of these variables include material properties of the particular lap and blank utilized, the rotational speeds of both the blank and the lap, the relative sizes of the lap and blank, the radial translation speed of the oscillating lap, the pressure exerted between the surfaces of the lap and blank, etc. Because of these many variables, trial and error techniques are preferred for establishing the lap center traversal versus blank radius relationship that is appropriate for a particular surface contour. However, once determined the relationship remains constant provided that the above noted polishing variables are uniformly maintained.

After derivation of the curve 131, the information represented thereby is transferred to a guide mechanism suitable for controlling the desired movement of the lap 23. In the invention embodiment disclosed herein, this guide mechanism comprises the disc cams 43 and 44 shown in FIGS. 1–3. FIG. 7 is an enlarged illustration of the disc cams 43 and 44 which conform to information retained by curve 131 of FIG. 6.

As indicated by FIG. 6, the dimensions of the cams 43 and 44 are derived directly from curve 131. The right half of curve 131 between the vertex 132 and low point 134 furnishes dimensions for disc cam 44 and the left half between vertex 132 and low point 133 furnishes dimensions for disc cam 43. Vertical line 137 represents angular positions around one half of the bilaterally symmetric cam 43 while the horizontal lines joining vertical line 137 and the left half of curve 131 represent radial dimensions of the cam 43 at the associated angular positions thereon. Similarly, vertical line 138 represents angular positions about one half of the bilaterally symmetric disc 44 while the horizontal lines joining vertical line 138 and the right half of curve 131 represent radial dimensions of cam 44 at the associated angular positions thereon.

Thus, line 141 represents the minimum radial dimension of cam 43; line 142 represents the radial dimensions of cam 43 at angular positions 45° from that minimum radius; line 143 represents radial dimensions of cam 43 at angular positions 90° from that minimum radius; line 144 represents radial dimensions of cam 43 at angular positions 135° from the minimum radius; and line 145 represents the maximum radial dimension of the cam 43 diametrically opposite the minimum radius. Similarly, line 146 represents the minimum radial dimension of cam 44 and line 147 represents the diametrically opposite maximum radial dimension thereof and lines 148, 149 and 151 represent radial dimensions of the cam 44 at angular positions, respectively, spaced 45°, 90° and 135° from the minimum radius.

FIG. 7 schematically illustrates the cams 43 and 44 dimensioned as described above and relatively positioned in the control system 41. The sensor tube 45 is shown in a relative position between the cams 43 and 44 that correspond to placement of the lap's 23 center perpendicularly adjacent that radial position on the work surface 12 represented by point 124 in FIG. 5. It will be appreciated, therefore, that the various mechanical parameters of the surface generating system 11 and the minimum cam radii represented by lines 141 and 146 are selected such that rectilinear movement of the sensor tube 45 through the distance $d$ (FIG. 7) would produce radial movement of lap 23 along the work surface 12 over a distance D (FIG. 6). This latter distance corresponds, of course, to the maximum desired amplitude of radial lap movement. Similarly, upon one half revolution by each of the cams 43 and 44 from the positions shown in FIG. 7, the cam edges having the maximum radii 145 and 147 will be aligned with the center of the sensor tube 45. In those relative positions, the cams 43 and 44 would produce the minimum or zero amplitude of radial lap movement represented by point 132 in FIG. 6.

Therefore, during reciprocating movement of the sensor tube 45 between the edges of the rotating disc cams 43 and 44, the optical lap's direction of radial movement is repeatedly reversed at those predetermined radial positions on the work surface 12 represented by the edges of cams 43 and 44. Thus, the lap 23 is oscillated with continuously varying amplitudes between the noted maximum and minimum values. Obviously, after an extended period of operation, the relative number of lap center traversals over each radially spaced annular area on the work surface 12 will correspond to the traversal frequency plot 131 (FIG. 6) and the desired surface contour 122 (FIG. 5) produced.

It should be understood that the disc cams 43 and 44 and the sensor unit 42 are merely exemplary and that many other widely diverse mechanisms can be programmed and used to produce the desired radial component reversals at predetermined relative positions between the lap and work surface. Examples of suitable control mechanisms include other well known mechanical type guides and sensors, magnetic tapes and readers, electrical digital counters, electrical timers, digital or analog computers, etc. Also, optical surface modifying mechanisms other than the optical lap 23 can be used according to the invention. Other suitable surface modifying mechanisms include, for example, ion beams, electrolytic polishing electrodes, vapor columns, etc. Also, movements other than those specifically disclosed herein can be used to produce the desired circumferential and oscillating radial components of relative movement between the lap 23 and the work surface 12.

Referring again to FIG. 1, one can observe that upon a given extent of movement by the traverse table 32 in either direction, one of the pins 52 or 53 will actuate either of their associated contact switches 49 or 51. As shown in FIG. 4, the actuation of either switch 49 or 51 opens electrical line 85 to interrupt the flow of electrical power to the system. Thus, in the event of a malfunction by the controller 41, system operation is automatically stopped to prevent either undesirable modification of the work surface 12 or movement of the lap 23 completely off the blank 13.

According to another feature of the invention, rotational synchronism between the disc cams 43 and 44 is prevented by use of the different sized pulleys 61 and 62 and by a loosely coupled belt 69 that allows slippage therebetween. For this reason, duplications of a given traversal path by the lap 23 on the work surface 12 are prevented. Such random lap movement enhances final surface quality in many applications. However, in some applications synchronous movement of the cams 43 and 44 and even of the blank 13 may be found desirable.

Obviously, many modifications and variations of the present invention are possible in light of the above teachings. It is to be understood, therefore, that within the scope of the appended claims the invention can be practiced otherwise than as specifically described.

What I claim is:

1. Optical surface generating apparatus comprising blank support means for supporting an optical blank, surface modifying means for altering the relative elevations on the work surface of an optical blank supported by said blank support means, drive means for producing relative transverse movement having both circumferential and oscillating radial components between said surface modifying means and the supported work surface, and automatic control means for continuously varying the amplitude of said oscillating radial component of relative movement to produce a varying number of movements of said surface modifying means over each of a plurality of annular concentric radially spaced areas on said work surface.

2. Optical surface generating apparatus according to claim 1 wherein said control means is adapted to generate desired radially symmetrical elevational changes on the work surface.

3. Optical surface generating apparatus according to claim 2 wherein the varying number of said movements through said radially spaced areas have a particular relationship predetermined so as to generate said desired radially symmetrical elevational changes on the work surface.

4. Optical surface generating apparatus according to claim 1 wherein said control means is adapted to randomly vary the amplitude of said oscillating radial component of relative movement.

5. Optical surface generating apparatus according to claim 1 wherein said control means is adapted to successively reverse the directional sense of said radial component when said surface modifying means is perpendicularly adjacent to predetermined continuously different radial positions on the work surface.

6. Optical surface generating apparatus according to claim 5 wherein said control means is adapted to generate desired radially symmetrical elevational changes on the work surface.

7. Optical surface generating apparatus according to claim 6 wherein said control means comprises a guide means retaining information relating to said different radial positions and responsive means adapted to reverse the directional sense of said radial component in response to actuation by said guide means.

8. Optical surface generating apparatus according to claim 7 wherein said responsive means is a sensor adapted for synchronous movement with said surface modifying means and to produce said direction reversals in response to periodic actuation by said guide means.

9. Optical surface generating apparatus according to claim 8 wherein said drive means produces said circumferential component of relative movement by rotating the optical blank and produces said oscillating radial component of relative movement by reciprocating said surface modifying means transversely over the work surface.

10. Optical surface generating apparatus according to claim 9 wherein said guide means comprises the surfaces of spaced apart cam mechanisms rotatively driven by said drive means, and said sensor means is adapted for reciprocating movement between said cam mechanisms.

11. Optical surface generating apparatus according to claim 10 wherein said cam mechanisms are driven at different variable rotary speeds so as to produce random changes in the amplitude of said radial component of relative movement.

12. Optical surface generating apparatus according to claim 1 wherein said surface modifying means comprises an optical lap.

13. Optical surface generating apparatus according to claim 12 wherein said control means is adapted to generate desired radially symmetrical elevational changes on the work surface.

14. Optical surface generating apparatus according to claim 12 wherein said control means is adapted to randomly vary the amplitude of said oscillating radial component of relative movement.

15. Optical surface generating apparatus according to claim 12 wherein said control means is adapted to successively reverse the directional sense of said radial component when said surface modifying means is perpendicularly adjacent to predetermined continuously different radial positions on the work surface.

16. Optical surface generating apparatus according to claim 15 wherein said control means is adapted to generate desired radially symmetrical elevational changes on the work surface.

17. Optical surface generating apparatus according to claim 16 wherein said control means comprises a guide means retaining information relating to said different radial positions and resposive means adapted to reverse the directional sense of said radial component in response to actuation by said guide means.

18. Optical surface generating apparatus according to claim 17 wherein said responsive means is a sensor adapted for synchronous movement with said surface modifying means and to produce said direction reversals in response to periodic actuation by said guide means.

19. Optical surface generating apparatus according to claim 18 wherein said drive means produces said circumferential component of relative movement by rotating the optical blank and produces said oscillating radial component of relative movement by reciprocating said surface modifying means transversely over the work surface.

20. Optical surface generating apparatus according to claim 19 wherein said guide means comprises the surfaces of spaced apart cam mechanisms rotatively driven by said drive means, and said sensor means is adapted for reciprocating movement between said cam mechanisms.

21. Optical surface generating apparatus according to claim 20 wherein said cam mechanisms are driven at different variable rotary speeds so as to porduce random changes in the amplitude of said radial component of relative movement.

22. Optical surface generating apparatus according to claim 12 wherein said optical lap has an effective surface area substantially smaller than the area of the work surface.

23. Optical surface generating apparatus according to claim 1 including protective means adapted to disable said drive means in response to a malfunction by said control means.

24. An optical surface generating method comprising the steps of producing relative transverse movement between a surface modifying mechanism and the work surface of an optical blank, producing the relative transverse movement in a path having both circumferential and oscillating radial components, and continuously varying the path of said surface modifying mechanism relative to said work surface for generating on the work surface a desired radially symmetrical surface contour.

25. An optical surface generating method according to claim 24 wherein the path variation is produced by reversing the direction of the radial oscillating component at continuously changing radial positions on the work surface.

26. A optical surface generating method according to claim 24 wherein the amplitude of the oscillating radial component is randomly varied within a predetermined program.

27. An optical surface generating method according to claim 26 wherein the continuous variations in the amplitude of the radial component of relative movement are produced by reversing the direction of the radial component at continuously changing radial positions on the work surface.

28. An optical surface generating method according to claim 24 wherein the surface modifying mechanism comprises an optical lap.

29. An optical surface generating method according to claim 28 wherein the path variation is produced by reversing the direction of the radial oscillating component at continuously changing radial positions on the work surface.

30. A optical surface generating method according to claim 28 wherein the amplitude of the oscillating radial component is randomly varied within a predetermined program.

31. An optical surface generating method according to claim 30 wherein the continuous variations in the amplitude of the radial component of relative movement are produced by reversing the direction of the radial component at continuously changing radial positions on the work surface.

32. Optical surface generating apparatus comprising means for supporting an optical blank; surface modifying means for altering the relative elevations on a work surface of said optical blank; drive means for producing relative transverse movement between said surface modifying means and said work surface, said relative transverse movement having both circumferential and oscillating radial components; and automatic control means for continuously varying the path of the movement between said surface modifying means and said work surface.

33. Optical surface generating apparatus according to claim 32 wherein the path of the movement between said surface modifying means and said work surface is continuously varied by continuously varying the amplitude of said oscillating radial component.

References Cited

UNITED STATES PATENTS

| | | | |
|---|---|---|---|
| 1,901,236 | 3/1933 | Guild | 51—3 |
| 2,087,514 | 7/1937 | Hubbell | 51—55 |
| 2,159,620 | 5/1939 | Long | 51—160 |
| 2,284,056 | 5/1942 | Indge | 51—55 |
| 2,985,989 | 5/1961 | Knost | 51—55 |
| 3,021,647 | 2/1962 | Maitenaz | 51—55 |
| 3,365,980 | 1/1968 | Hoffmann | 51—160X |

DONALD G. KELLY, Primary Examiner

U.S. Cl. X.R.

51—284